May 3, 1932.  C. D. BURKLE  1,856,208
PLANTER ATTACHMENT
Filed July 25, 1931  2 Sheets-Sheet 1

Inventor

C. D. Burkle

By Clarence A. O'Brien
Attorney

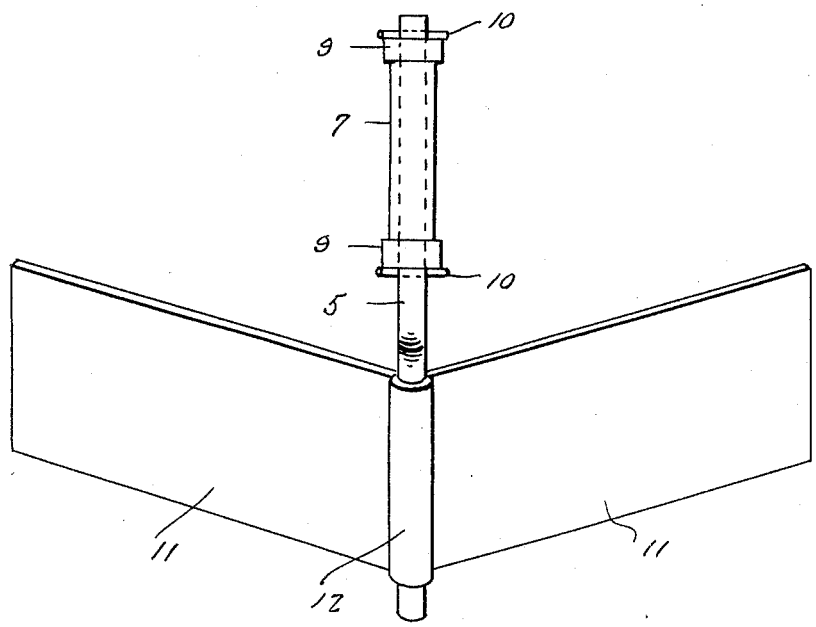
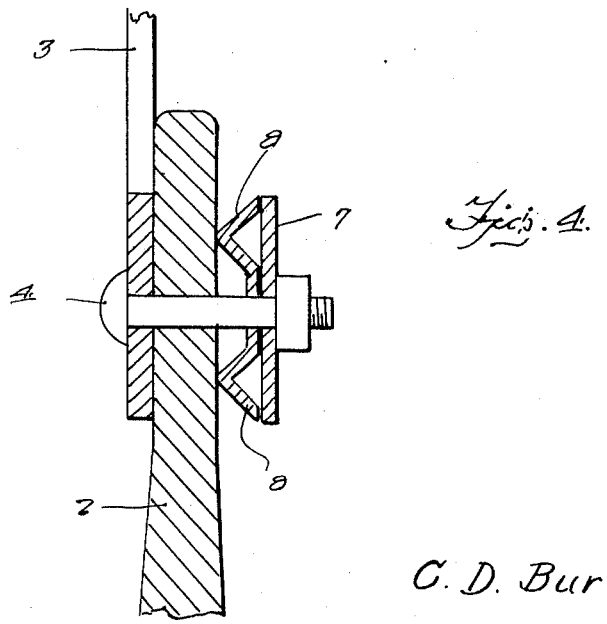

Patented May 3, 1932

1,856,208

UNITED STATES PATENT OFFICE

CHARLES D. BURKLE, OF GENEVA, IOWA

PLANTER ATTACHMENT

Application filed July 25, 1931. Serial No. 553,148.

The present invention relates generally to agricultural implements or machines and more particularly to a planter attachment and has for its primary object to provide, in a manner as hereinafter set forth, a device of this character for smoothing or leveling the ground as the seed is planted, thus permitting comparatively shallow planting at a uniform depth and also assuring that the seed will be properly covered.

Other objects of the invention are to provide a planter attachment of the character described which will be simple in construction, strong, durable, efficient and reliable in use, which may be manufactured at low cost and which may be mounted on planters of conventional construction without the necessity of materially altering said planters structurally.

All of the foregoing and still further objects and advantages of the invention will become apparent from a study of the following specification, taken in connection with the accompanying drawings, wherein like characters of reference designate corresponding parts throughout the several views, and wherein:—

Figure 2 is a view in front elevation of the device.

Figure 4 is a detail view in vertical section showing the means for securing the supporting bracket to the planter shoe.

Figure 1:
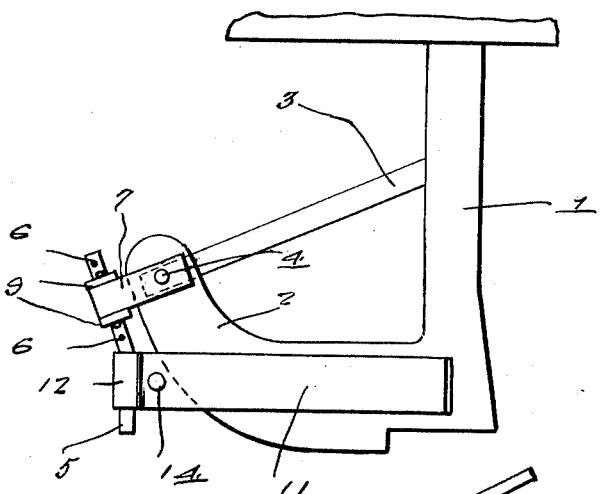
Figure 1 is a view in side elevation showing an attachment in accordance with this invention mounted in position on a planter.
Figure 3:
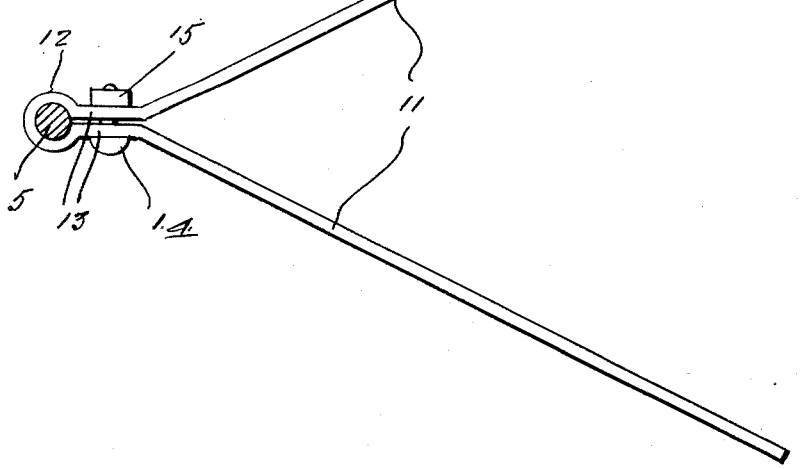
Figure 3 is a view in top plan of the levelling wings showing the supporting rod in horizontal section.

Referring now to the drawings in detail, it will be seen that the reference numeral 1 designates a conventional seed depositing spout having on its lower end, as usual, a forwardly and upwardly directed shoe 2, the forward end of which is strengthened by a diagonal brace 3 having its lower end connected to the upturned free end portion of the shoe by a bolt 4.

The attachment constituting the present invention comprises an angular rod 5 having its lower portion disposed substantially vertically and its upper portion inclined forwardly and provided with a series of openings 6. The supporting rod 5 is mounted in position on the forward portion of the shoe 2 through the medium of a metallic bracket 7 which comprises a strip of metal bent upon itself in a manner to provide a loop for the reception of the upper portion of the rod 5, the end portions of the strip having registering openings therein for the passage of the bolt 4 for securing said bracket on the shoe 2 in the manner illustrated to advantage in Figure 4 of the drawings. The portion of the bracket 7 which is adjacent the shoe 2 is formed with the substantially V-shaped ribs 8 for engagement with the shoe. Collars 9 encircle the upper portion of the rod 5 above and below the loop of the bracket 7 and the rod 5 is adjustably secured in position on the bracket by the cotter pins 10 which are selectively insertable in the openings 6 above the uppermost collar 9 and below the lowermost collar 9.

The reference numeral 11 designates a pair of rearwardly diverging wings which straddle the shoe 2. The wings 11 are formed integrally with each other from a single length of suitable metal which is bent upon itself in a manner to provide a loop 12 for the reception of the vertically disposed lower portion of the rod 5, said loop also constituting the connecting means for the wings 11. The strip of metal from which the wings 11 are formed further includes the opposed, parallel portions 13 having registering openings therein for the passage of a clamping bolt 14 having a nut 15 threaded thereon. This bolt and nut, of course, constitute means for contracting the loop 12 on the lower portion of the rod 5 for mounting the wings in position thereon.

The rod 5 extends below the wings 11 to break the ground for the shoe 2 and to clear the path of said shoe of obstructions, such as the stubs of corn stalks, stones, or clods. The wings 11 smooth or level the ground in which the seed is to be deposited and to clear said ground of stones and clods, on the surface. It will further be seen that the wings may be expeditiously adjusted relative to the ground and to the shoe 2. Of course, an attachment in accordance with this invention is mounted on each shoe of a planter.

It is believed that the many advantages of a planter attachment in accordance with this invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. An attachment for planters of the type having a seed depositing spout and a shoe on the lower portion of the spout and extending forwardly and upwardly therefrom, comprising an angular rod having a substantially vertically disposed lower portion and a forwardly inclined upper portion having a series of openings therein, a bracket for mounting the rod in position on the shoe forwardly of said shoe, said bracket including a strip of metal bent upon itself to provide a loop encircling the rod, means securing the bracket to the shoe, collars on the rod above and below the bracket, cotter pins selectively insertable through the openings in the rod for securing said rod in position on the bracket, and a pair of integral diverging ground leveling wings mounted on the substantially vertical lower portion of the rod and extending rearwardly therefrom on opposite sides of the shoe.

2. An attachment for planters of the type having a seed depositing spout and a shoe on the lower portion of the spout and extending forwardly and upwardly therefrom, comprising an angular rod having a substantially vertically disposed lower portion and a forwardly inclined upper portion having a series of openings therein, a bracket for mounting the rod in position on the shoe forwardly of said shoe, said bracket including a strip of metal bent upon itself to provide a loop encircling the rod, means securing the bracket to the shoe, collars on the rod above and below the bracket, cotter pins selectively insertable through the openings in the rod for securing said rod in position on the bracket, and a pair of integral diverging ground leveling wings mounted on the substantially vertical lower portion of the rod and extending rearwardly therefrom on opposite sides of the shoe, said wings being formed from a single length of metal bent upon itself in a manner to provide a loop for the passage of the rod and a pair of spaced, parallel portions having registering openings therein, and means disposed through the openings and engaged with said parallel portions for contracting the loop on the rod.

In testimony whereof I affix my signature.

CHARLES D. BURKLE.